(12) United States Patent
Reddy et al.

(10) Patent No.: US 12,292,984 B2
(45) Date of Patent: May 6, 2025

(54) USER AUTHENTICATION AND AUTHORIZATION FOR CONTAINERS

(71) Applicant: Dell Products L.P., Round Rock, TX (US)

(72) Inventors: A Ashok Kumar Reddy, Bangalore (IN); Vimal Krishna, Bengaluru (IN); Balaguru Veerappan, Coimbatore (IN)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 18/301,501

(22) Filed: Apr. 17, 2023

(65) Prior Publication Data

US 2024/0346159 A1  Oct. 17, 2024

(51) Int. Cl.
 *G06F 21/60* (2013.01)
 *G06F 21/62* (2013.01)

(52) U.S. Cl.
 CPC ........ *G06F 21/604* (2013.01); *G06F 21/6218* (2013.01); *G06F 2221/2137* (2013.01); *G06F 2221/2141* (2013.01)

(58) Field of Classification Search
 CPC .............. G06F 21/604; G06F 21/6218; G06F 2221/2137; G06F 2221/2141
 See application file for complete search history.

(56) References Cited

U.S. PATENT DOCUMENTS

| | | | | |
|---|---|---|---|---|
| 11,627,124 | B2 * | 4/2023 | Cao | G06F 21/6218 726/8 |
| 11,936,646 | B2 * | 3/2024 | Pitters | H04L 63/0838 |
| 2004/0236760 | A1 * | 11/2004 | Arkeketa | G06F 21/6218 |
| 2012/0264402 | A1 * | 10/2012 | Zhang | H04W 12/069 455/411 |
| 2019/0286832 | A1 * | 9/2019 | Szeto | H04W 12/082 |
| 2021/0311758 | A1 * | 10/2021 | Cao | G06F 8/70 |
| 2023/0116463 | A1 * | 4/2023 | Rath | H04L 63/102 726/22 |

FOREIGN PATENT DOCUMENTS

| | | | | | |
|---|---|---|---|---|---|
| JP | 2004533075 A | * | 10/2004 | ......... | G06F 21/6245 |
| WO | WO-2012026082 A1 | * | 3/2012 | ....... | G06F 17/30386 |
| WO | WO-2013091196 A1 | * | 6/2013 | ............. | G06F 21/00 |

\* cited by examiner

*Primary Examiner* — Michael R Vaughan
(74) *Attorney, Agent, or Firm* — DALY, CROWLEY, MOFFORD & DURKEE, LLP (57) ABSTRACT

An example methodology includes, by a container hosted on a computing device, receiving a request to access the container, the request including a temporary username and password and an access group to which a user associated with the request belongs. The method also includes, by the container, creating a temporary user credentials based on the temporary username and password, adding the user to the container, mapping the access group passed with the request to an equivalent predefined access group within the container, and assigning the user to the equivalent predefined access group, wherein the predefined access group within the container specifies permissions to be granted to the user. The method further includes, by the container, providing access to the container based on the temporary user credentials and the equivalent predefined access group and sending a response to the request, the response including information about the provided access to the container.

20 Claims, 6 Drawing Sheets

| Predefined Access Group → | Level1_grp | Level2_grp | Level3_grp | Level4_grp |
|---|---|---|---|---|
| Executable Access | Access Table (Who gets what access?) | | | |
| Basic Executables | Y | Y | Y | Y |
| Read-Only Executables | Y | Y | Y | Y |
| Archiving Tools | N | Y | Y | Y |
| Performance Tools | N | Y | Y | Y |
| Read-Write Executables | N | N | Y | Y |
| File System Tools | N | N | N | Y |
| File/Dir Executables | N | N | N | Y |
| User/Group Tools | N | N | N | Y |
| Boot Commands | N | N | N | Y |
| . . . | | | | |
| Partition/Directory/File Access (User/Access Group Permissions) | | | | |
| Read-Only Boot Partition (/boot) | N | Y | Y | N |
| Read-Only Data Partition (/data) | N | Y | N | N |
| Read-Write Boot Partition | N | N | N | Y |
| Read-Write Data Partition | N | N | Y | Y |
| Read-Only /var/log | Y | Y | Y | Y |
| Read-Only /var/log/audit | Y | Y | Y | Y |
| Read-Write /var/log | N | N | N | N |
| Read-Only ETC Files | N | N | Y | Y |
| Read-Write ETC Files | N | N | N | Y |
| . . . | | | | |
| Superuser Command Access | | | | |
| Install rpms | N | N | N | Y |
| Shutdown/reboot | N | Y | Y | Y |
| Add/remove users | N | N | N | N |
| Add/remove access groups | N | N | N | N |
| . . . | | | | |

USER AUTHENTICATION AND AUTHORIZATION FOR CONTAINERS

BACKGROUND

Data storage systems (also referred to herein more simply as "storage systems") may include storage devices (e.g., storage arrays) which are often used by host systems (sometimes referred to herein more simply as "hosts"). The storage devices and the hosts may be situated in the same physical location, or in one or more physically remote locations. The hosts may be coupled to the storage devices by a high-speed interconnect, such as a switch fabric.

A host may host applications that utilize the storage devices provided by a storage system. For example, applications running on the host may utilize storage devices to store and retrieve data. In addition to the applications running on the hosts, applications may also be running on the storage system itself, for example, as part of managing or providing technical support for the storage system.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a container hosted on a computing device, receiving a request to access the container, wherein the request includes a temporary username and password and an access group, wherein the access group is a user group to which a user associated with the request belongs. The method also includes, by the container, creating a temporary user credentials based on the temporary username and password passed with the request to access the container, adding the user to the container, mapping the access group passed with the request to an equivalent predefined access group within the container, and assigning the user to the equivalent predefined access group, wherein the predefined access group within the container specifies permissions to be granted to the user. The method further includes, by the container, providing access to the container based on the temporary user credentials and the equivalent predefined access group and sending a response to the request to access the container, wherein the response includes information about the provided access to the container.

In some embodiments, the access to the container is via a Secure Shell (SSH) session.

In some embodiments, the method also includes, by the container, creating one or more custom rules to be applied to the access of the container. In one aspect, a custom rule of the one or more custom rules defines an additional security check to authenticate the user. In one aspect, a custom rule of the one or more custom rules defines a prerequisite command performed prior to user login to the container.

In some embodiments, the method also includes, by the container, a request to close a user session associated with the temporary user credentials and deleting the temporary user credentials in response to the request to close the user session associated with the temporary user credentials.

In some embodiments, the method also includes, by the container, setting an expiration for the temporary user credentials to a credential expiration day. In one aspect, the credential expiration day is passed with the request to access the container.

In some embodiments, the method also includes, by the container, deleting the temporary user credentials on a credential expiration date.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Use of application containers is becoming increasingly popular to execute applications on a host. A container, such as a Docker container, isolates an application from the environment and ensures uniform execution of the application across computing environments. The container does not include an operating system image. Rather, the container relies on the underlying host's operating system kernel functionality and resources (e.g., CPU, memory, I/O, etc.) and separate namespaces. Containers have proven advantageous since they are lightweight and portable. For instance, containerized applications have been found to be more easily and rapidly deployed, patched, upgraded, and scaled. However, container image building tools, such as the DOCKER_BUILDKIT container image builder provided by Docker, may not support access control lists (ACLs) for the files and directories in a container image. Thus, even if ACLs are applied while building container images using such container image building tools, the ACLs are not reflected in the containers. Without a capable access control mechanism, the application containers are exposed to unauthorized access, which can lead to misuse and compromise of data contained in the files and directories in the application containers.

Disclosed herein are concepts, structures, and techniques for building a user authentication and authorization mechanism for containers, such as, for example, Docker containers. This can be achieved by dynamic management of users mapped to access profiles within the containers. In some embodiments, container images are built with persistent predefined access control lists (ACLs) on the necessary objects, such as files and directories, in the container image. In some such embodiments, predefined access groups (sometimes referred to herein as "user groups" or more simply as "groups") which map to the access structure of the underlying ecosystem, such as LINUX ACLs in the case of LINUX container images, can be created, and the files and directories can be mapped to the groups via the ACLs in a container image. User credentials (e.g., login credentials) for a user are dynamically created only at the time of user access to a running container based on the level of access the user is allowed as determined by the user's access group. Once the user is finished accessing the container, the dynamically created user credentials can be deleted. That is, the dynamically created user credentials can be deleted upon completion of the user's access of the container. In some embodiments, the dynamically created user credentials can be deleted once the user is finished accessing the container or on a predetermined credential expiration day, whichever comes first. As such, the dynamically created user credentials can be understood to be temporary credentials which are active for a single access for which the credentials were created. Numerous configurations and variations will be apparent in light of this disclosure.

As used herein, the term "user" refers, in addition to its ordinary meaning, to a person or thing that uses something, either stated or implied. For example, a user can be any person, system, or other entity that uses a storage system to read/write data. A user may be a human or a non-human (e.g., an application or system).

In addition, in the implementations that follow, it should be understood that, although certain specific embodiments may use particular brands and names of products (e.g., Dell EMC products, etc.,), none of the embodiments described herein are intended to be limited to using products from any vendor.

Figure 1:
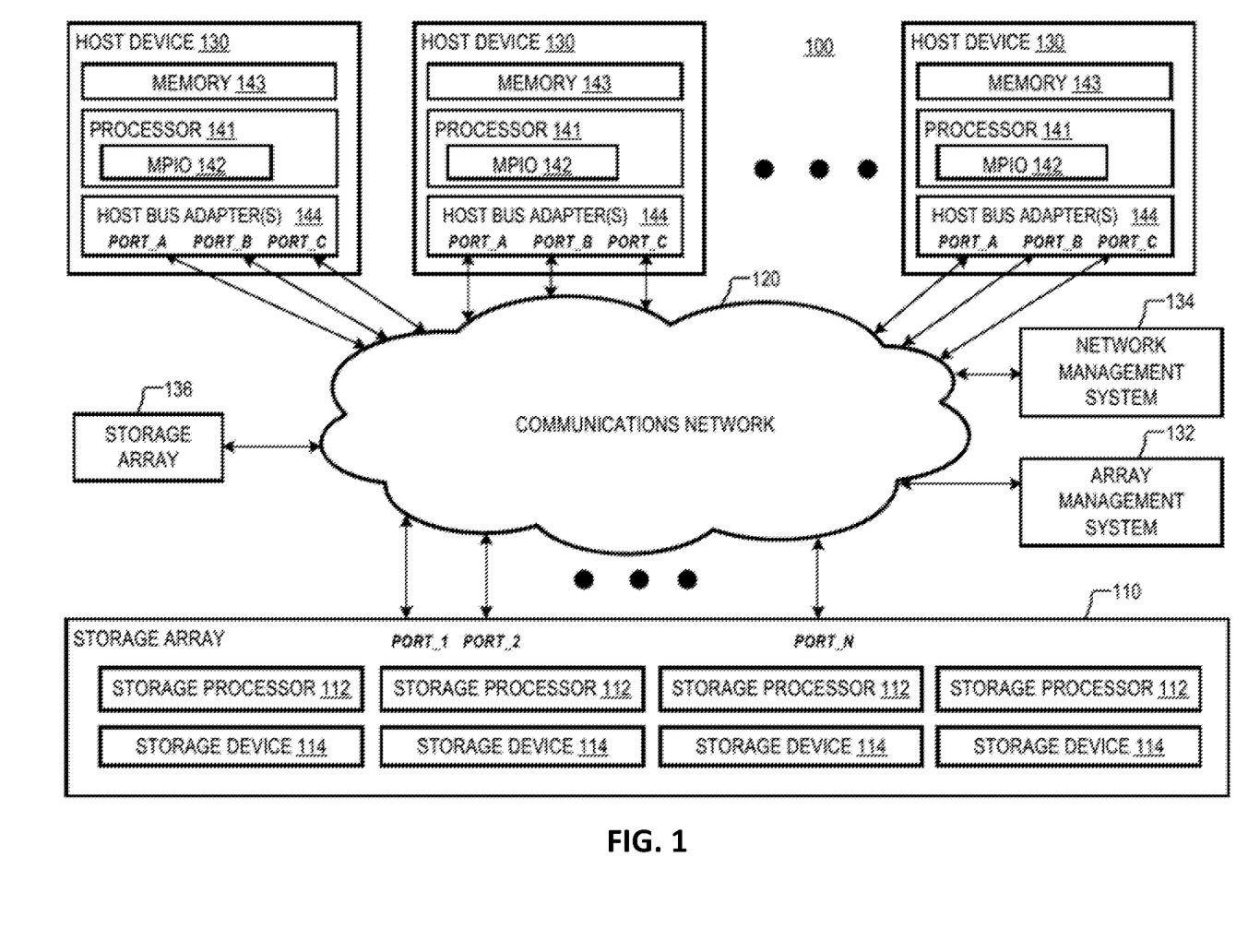
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 600 of FIG. 6. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 6:
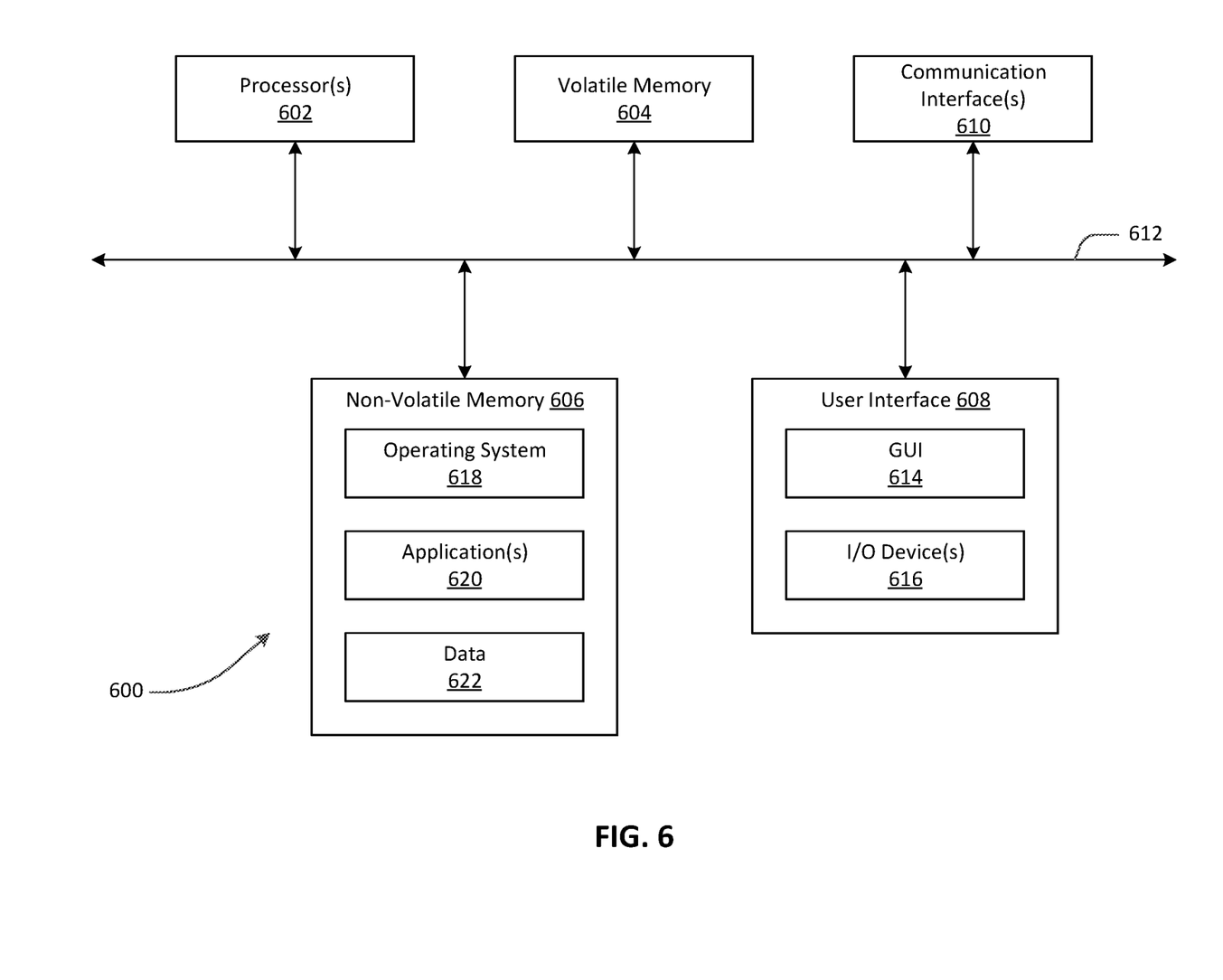
FIG. 6 is a block diagram illustrating selective components of an example computing device in which various aspects of the disclosure may be implemented, in accordance with an embodiment of the present disclosure.

Array management system 132 may include a computing device, such as computing device 600 of FIG. 6. Array management system 132 may be used by a system administrator to re-configure storage array 110, e.g., when degraded performance of storage array 110 is detected.

Network management system 134 may include a computing device, such as computing device 600 of FIG. 6. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
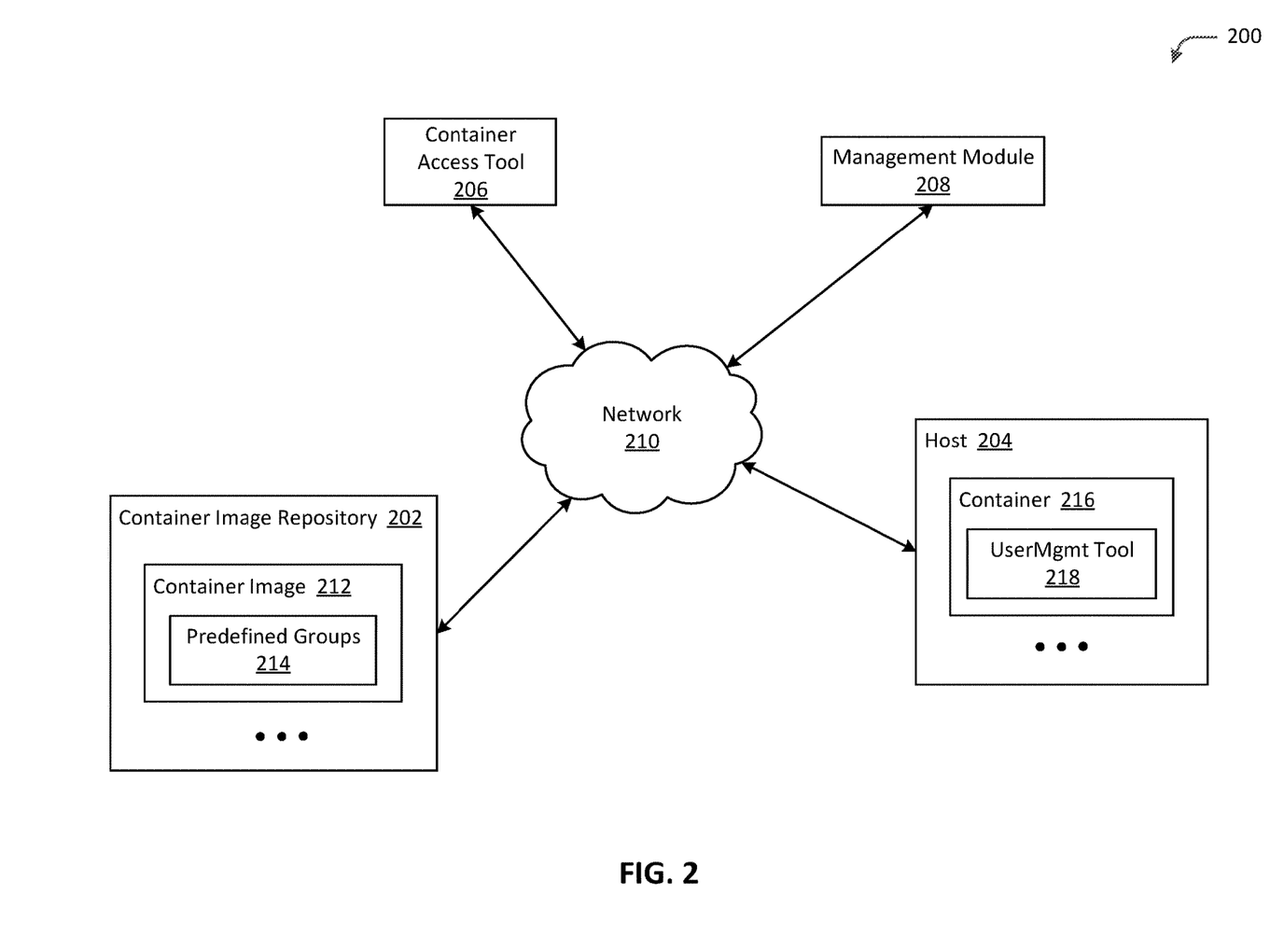
FIG. 2 is a diagram of an illustrative network environment in which user authentication and authorization for containers can be provided, in accordance with an embodiment of the present disclosure.

Referring now to FIG. 2 and with continued reference to FIG. 1, shown is a diagram of an illustrative network environment 200 in which user authentication and authorization for containers can be provided, in accordance with an embodiment of the present disclosure. As shown, illustrative network environment 200 includes a container image repository 202, a host 204, a container access tool 206, and a management module 208. Container image repository 202, host 204, container access tool 206, and management module 208 may be communicably coupled to one another via a network 210. Network 210 may correspond to one or more wireless or wired computer networks including, but not limited to, LANs, WANs, wireless local-area networks (WLAN), FC networks, Wi-Fi (i.e., 802.11) networks, and any other suitable type of network. In some embodiments, container image repository 202 and host 204 may correspond to any node within storage system 100, such as host device 130 and management systems 132, 134, and network 210 may correspond to network 120. In some embodiments, container access tool 206 may be included in or implemented as part of management module 208.

Container image repository 202 is operable to store one or more container images 212. Container images 212 may or may not be Docker container images. Container image repository 202 can provide a centralized resource to manage, pull, and push container images. Container image repository 202 may be located within an on-premises data center of an organization, within one or more cloud computing environments (e.g., a public cloud, a private cloud, or a hybrid cloud), or in a combination thereof, or elsewhere. Container images 212 stored within container image repository 202 can be deployed and executed on a host, such as, for example, host 204. In this regard, host 204 can be understood as an OS/platform to host containers. To promote clarity in the drawings, FIG. 2 shows a single container image 212 stored within container image repository 202. However, it will be appreciated that container image repository 202 can store a large number of container images 212.

As shown in FIG. 2, each container image 212 within container image repository 202 may include one or more predefined groups 214. In some embodiments, for a particular container image 212, predefined groups 214 may be created during the build process of the particular container image 212. Each predefined group 214 may be composed of one or more users assigned to the group. In one embodiment, the one or more predefined groups 214 may map to the access structure of the underlying ecosystem, such as, for example, host 204 on which the containers are hosted. Accessible objects, such as, for example, executables, commands, directories, and files, may be mapped to predefined groups 214 via the ACLs in container image 212. Access to the accessible objects in container image 212 can then be granted based on the ACLs and the mapping of predefined groups 214 to the accessible objects. Further description of the creation and operation of predefined groups 214 is provided below at least with respect to FIG. 3.

Container access tool 206 is operable to provide access to containers. For example, container access tool 206 can present a user interface (UI), such as a graphical UI or other type of UI, that a user can use to access a container, such as a container 216 on host 204. In embodiments, container 216 on host 204 may be a run time instance of a particular container image 212. As shown in FIG. 2, container 216 can include a user management tool 218. In some embodiments, container access tool 206 and user management tool 218 may interoperate to provide access to container 216 using dynamically created user credentials as variously described herein. To promote clarity in the drawings, FIG. 2 shows a single container 216 on host 204. However, it will be appreciated that host 204 can host a large number of containers 216.

Container access tool 206 can communicate with container 216 using an application program interface (API), such as, for example, a Secure Shell (SSH) API. For example, container access tool 206 can utilize the API to send requests (or "messages") to container 216 wherein the requests are received and processed by user management tool 218 or one or more other components of container 216. Likewise, container 216 can utilize the API to send responses/messages to container access tool 206.

For example, according to one embodiment, container access tool 206 may provide a UI control/element that a user can click/tap to access a container, such as container 216 on host 204. In particular, according to one embodiment, a user can use container access tool 206 to access a container subsequent to logging in to the underlying ecosystem within which the container is running. In the example of FIG. 2, a user may utilize a client device (not shown) to access a UI provided by management module 208 configured for use in managing and configuring various elements of storage system 100. The user can then use the provided UI to authenticate themselves with storage system 100 (e.g., use the provided UI to log in to storage system 100). Upon logging in to storage system 100 (e.g., the underlying ecosystem of host 204), the user may be assigned to or otherwise associated with a group within storage system 100 and granted permissions based on the user's assigned or associated group. That is, within storage system 100, the user may be granted permissions defined for the group to which the user belongs. For example, if the user belongs to a group named "Admins", the user is granted permissions defined for the Admins group within storage system 100. As another example, if the user belongs to a group named "TechManagers", the user is granted permissions defined for the TechManagers group within storage system 100. Having successfully logged on to storage system 100, the user can utilize container access tool 206 to access container 216 on host 204, for example.

In response to the user clicking or tapping the UI control/element to access container 216 on host 204, container access tool 206 can create a temporary username and password for accessing container 216. The temporary username and password created by container access tool 206 can be understood to be a dynamically created temporary user credentials that enables the user to authenticate identity and log in to and access container 216. Container access tool 206 can also determine the group within storage system 100 to which the user belongs. In other words, container access tool 206 can determine the name of the group, e.g., group name, to which the user belongs. In some embodiments, container access tool 206 can determine a credential expiration day for the temporary username and password. The credential expiration day is a predetermined date on which the username and password for accessing container 216 is to expire (e.g., a predetermined date on which the temporary user credentials are no longer valid for accessing container 216). Container access tool 206 can then send a message to container 216 requesting access to the container. The request message sent to container 216 can include as parameters the temporary username and password, the name of the group (e.g., group name) to which the user belongs, and the credential expiration day.

In response to sending the request message, container access tool 206 may receive a response message which includes information about access to container 216. For example, container access tool 206 may receive a response message authorizing access to container 216 upon successful execution of the request to access by container 216. The authorized access to container 216 may be via a session created based on the temporary username and password, the user's group name, and the credential expiration day provided with the request from container access tool 206. In response to receiving the response message indicating successful execution of the request (e.g., indicating access to container 216), container access tool 206 can provide the user access to container 216. In one embodiment, container access tool 206 may provide the user access to container 216 via a Secure Shell (SSH) session. For example, container access tool 206 can initiate a SSH session to the user's client device and present a UI for accessing container 216. The user can then use the UI to access container 216 via the SSH session.

Referring to container 216, in response to a request to access the container being received, user management tool 218 of container 216 may create temporary user credentials for accessing container 216 as per the parameters passed with the request. For example, according to one implementation, user management tool 218 can accept and validate the inputs such as, for example, the temporary username and password, the group name, and the credential expiration day.

Upon validation, user management tool 218 can map the group name passed with the request to an equivalent group (e.g., an appropriate predefined group 214) within container 216. User management tool 218 can then add a user (e.g., the user associated with the request) to container 216 using the temporary username and password and assign the user to the mapped group within container 216. As a result, access to container 216 can be based on the permissions associated with the mapped group within container 216. In some embodiments, user management tool 218 may set an expiration for the temporary user credentials to the credential expiration day passed with the request. In such embodiments, user management tool 218 can delete the temporary user credentials (e.g., the temporary username and password) on the credential expiration day, if not already deleted. For example, user management tool 218 can run a cronjob to expire the user. In some embodiments, user management tool 218 may create one or more custom rules that are applied to the user access of container 216. The custom rules may define requirement-based activities associated with the access of container 216. For example, a custom rule may define an additional security check that is to be performed to authenticate the user prior to granting the user access to container 216. As another example, a custom rule may define a prerequisite command (e.g., mounting a device inside the container, setting an environmental variable, enabling a port, or running a command) that is performed prior to user login to container 216. In any case, upon successfully adding the user to container 216, user management tool 218 can send a message to container access tool 206 responding to the request to access container 216. The response message sent to container access tool 206 can include information about a session created for accessing container 216.

In some embodiments, container access tool 206 may send a message to a container requesting closure or termination of a user session associated with the dynamically created user credentials. By way of an example, container access tool 206 may monitor for the closing of a session (e.g., SSH session) with container 216. Upon detecting the closing of the session (e.g., user log out of container 216), container access tool 206 can send a message to container 216 that causes user management tool 218 of container 216 to delete the dynamically created user credentials (e.g., delete the temporary username and password) used to access container 216.

Figure 3:
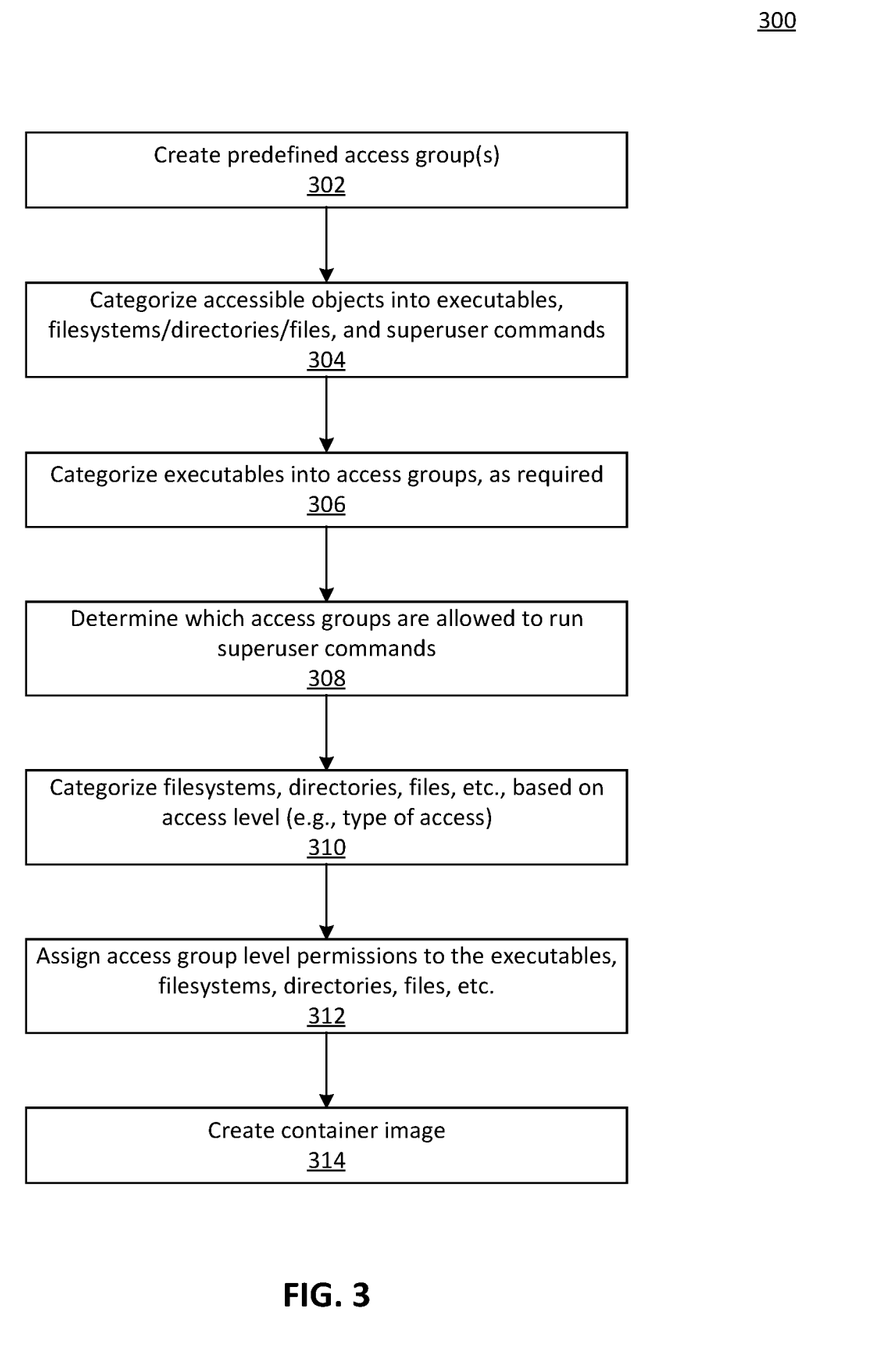
FIG. 3 is a flow diagram of an example process for creating a container image, in accordance with an embodiment of the present disclosure.

FIG. 3 is a flow diagram of an example process 300 for creating a container image, in accordance with an embodiment of the present disclosure. Illustrative process 300 may be implemented, for example, using any entity or device within or associated with a system, such as storage system 100 described above in conjunction with FIG. 1 and/or network environment 200 described above in conjunction with FIG. 2.

With reference to process 300 of FIG. 3, at 302, one or more predefined access groups may be created. For purposes of this discussion, it is assumed that instances of the container images are to execute within a LINUX cluster environment (e.g., storage system 100 of FIG. 1) composed of PowerMax™ storage arrays. For example, one or more predefined access groups which map to the PowerMax™ access structure can be created. Each predefined access group may correspond to a group of one or more users in the cluster environment.

At 304, accessible objects may be categorized into executables, filesystems/directories/files, and superuser commands. Accessible objects include the objects in the container which may be accessed by users. The individual objects which are accessible may be categorized into one of executables, filesystem/files/directories, and superuser commands (or "sudoers").

At 306, the executables may be categorized into access groups, as required. The access groups include the predefined access groups created at 302. For example, all the executables (i.e., the accessible objects categorized as executables) may be categorized into as many access groups, as required. The categorization of the executables can be used to determine (decide) which user group will get access to which group of executables. Non-limiting examples of groups of executables include basic executables, archive tools, performance tools, read-write executables, file system tools, user tools, and system tools, among other groups of executables. These groups of executables can be marked to or otherwise associated with respective access groups based on the type of access that is to be allowed to users in that access group.

At 308, the access groups which are allowed to run superuser commands may be determined. For example, superuser commands include commands that require root access or superuser/root privileges, such as the shutdown command, reboot command, add user command, delete user command, add group command, and delete group command, among others. The superuser commands can be marked to indicate which access group is allowed to execute the superuser command (e.g., indicate users of which access group are allowed to execute the superuser command).

At 310, the filesystems, directories, files, etc., may be categorized based on access level (e.g., type of access control). For example, the filesystems, directories, files, etc., may be divided into which files are to be accessible by all the access groups, which directories are to be accessible by which of the access groups, which directories are to be allowed only read access to which of the access groups, which files are to be allowed only read-write access to which of the access groups, which files are to be allowed only read access to which of the access groups, and so on. This results in the filesystems, directories, and files being divided (or "grouped") based on type of access control, such as, for example, read only, read-write, etc.

At 312, access group level permissions may be assigned to the executables, filesystems, directories, files, etc. For example, the ACLs with respect to the respective access groups may be mapped to the executables, filesystems, directories, files, etc. An ACL is a list of permissions attached to an object and the ACL specifies which access groups (e.g., users of which access groups) are granted access to the object, as well as what operations are allowed on the object. At 314, a container image may be created. The created container image includes the group level permissions applied to the accessible objects.

Figure 4:
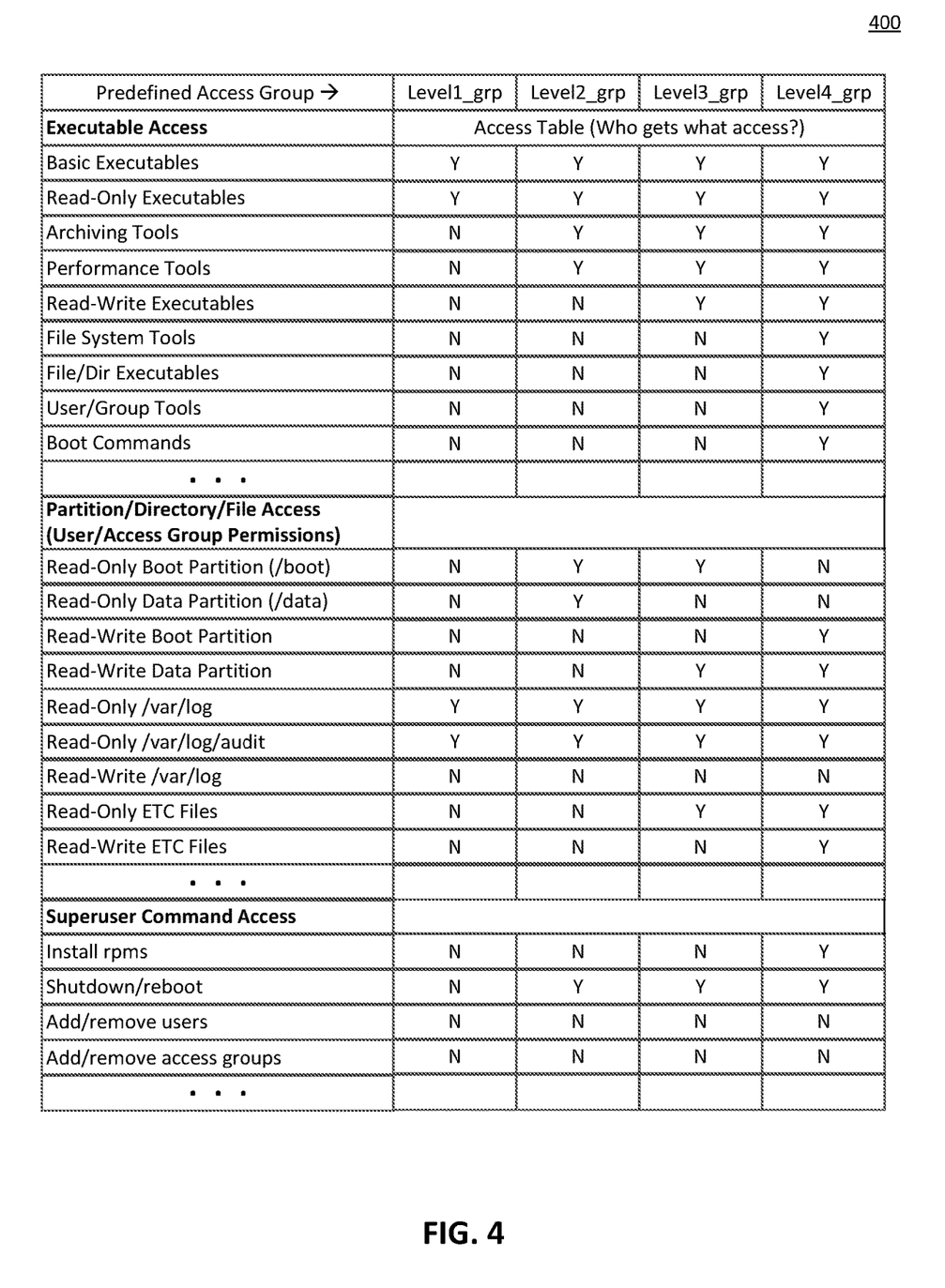
FIG. 4 illustrates a portion of an example group level permissions table, in accordance with an embodiment of the present disclosure.

FIG. 4 illustrates a portion of an example group level permissions table 400, in accordance with an embodiment of the present disclosure. For example, illustrative table 400 may be generated to record assignment of access groups to accessible objects in a container image. In the example, of FIG. 4, table 400 may record four access groups, Level1_grp, Level2_grp, Level3_grp, and Level4_grp, assigned to executables, partitions/directories/files, and superuser commands. The executables, partitions/directories/files, and superuser commands indicated in table 400 may be the objects determined to be accessible in the container image.

As shown, each row (or "record" or "entry") in table 400 can represent an accessible object (e.g., file system tools) or accessible objects categorized by type of access control (e.g., read-write data partition). The columns in table 400 can represent the respective access groups, and each cell in a column can indicate whether the respective access group has access (as indicated by a "Y") or does not have access (as indicated by a "N") to the corresponding accessible object or the corresponding accessible objects categorized by type of access control. For example, as indicated by the record representing basic executables in table 400, the basic executables are accessible to users in Level1_grp, Level2_grp, Level3_grp, and Level4_grp. In other words, the users in any one of Level1_grp, Level2_grp, Level3_grp, and Level4_grp are granted permission to access the basic executables. As another example, as indicated by the record representing read-write executables in table 400, the read-write executables are accessible to users in Level3_grp and the users in Level4_grp, but not accessible to users in Level1_grp and the users in Level2_grp. In other words, the users in Level3_grp and the users in Level4_grp are granted permission to access the read-write executables. However, the users in Level1_grp and the users in Level2_grp are not granted permission to access the read-write executables.

Figure 5:
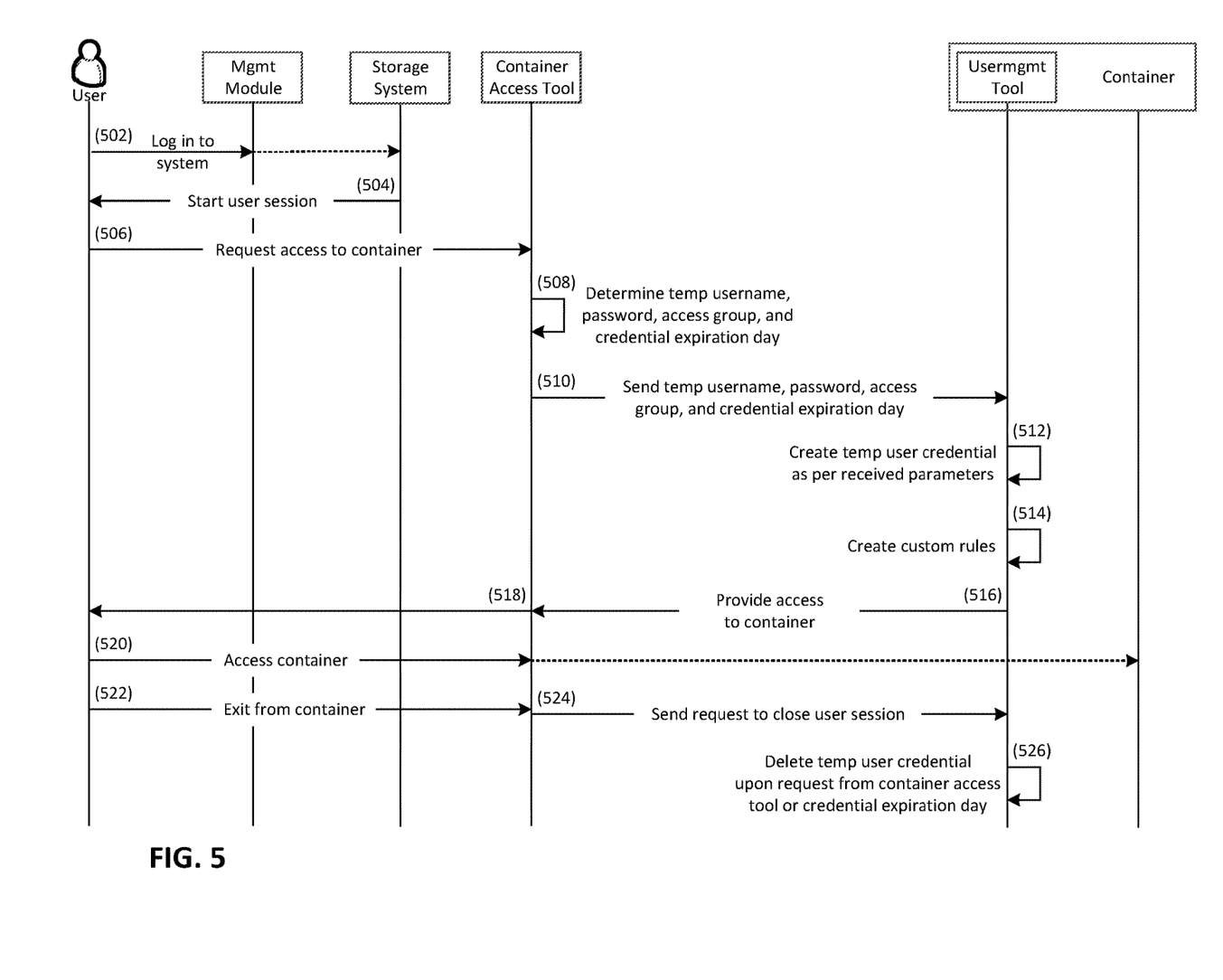
FIG. 5 is a sequence diagram showing an example flow of interactions between various components to access a container, in accordance with an embodiment of the present disclosure.

FIG. 5 is a sequence diagram showing an example flow of interactions between various components to access a container, in accordance with an embodiment of the present disclosure. For example, the interactions may be between various components of network environment 200 of FIG. 2 to access a container. For purposes of this discussion, the access may be of container 216 on host 204 in network environment 200 of FIG. 2. Also, network environment 200 may be included within or a part of storage system 100 of FIG. 1.

In the example of FIG. 5, a user using a computing device may utilize a management module to log in to storage system 100 (502). Upon successfully authenticating the user, storage system 100 may start a user session (504) for the user's access of storage system 100. While accessing storage system 100, the user may utilize a container access tool (e.g., container access tool 206) and request access to container 216 (506). In response, container access tool 206 may create a temporary username and password for accessing container 216 (508). Container access tool 206 may also determine the access group to which the user belongs and a credential expiration day. Container access tool 206 may then send the temporary username and password, the access group, and the credential expiration day to container 216 (510). For example, container access tool 206 can send a message to container 216 requesting access to the container and include the temporary username and password, access group, and credential expiration day as parameters.

In response to the request to access container 216, a user management tool of container 216 (e.g., user management tool 218) may create temporary user credentials for accessing container 216 (512). For example, user management tool 218 can validate the temporary username and password, access group, and credential expiration day passed with the request. User management tool 218 can also map the access group passed with the request to an equivalent predefined access group within container 216. User management tool 218 can then add the user to container 216 and assign the user to the equivalent predefined access group (e.g., the predefined access group that mapped to the access group passed with the request). Assigning the user to the equivalent predefined access group determines the permissions that are granted to the user (e.g., as a member of the equivalent predefined access group, the user is granted the permission granted to the equivalent predefined access group). User management tool 218 can also set an expiration for the temporary user credentials (e.g., the temporary username and password) to the credential expiration day.

In some embodiments, user management tool 218 may create one or more custom rules (514). The created custom rules can be applied to the user access of container 216. The temporary user credentials can then be used to authenticate and authorize the user to access container 216. That is, the temporary username and password can be used to login the user to access container 216. Upon successful login, user management tool 218 can provide the requested access to container 216 (516). The access to container 216 is based on the temporary user credentials and the assignment of the user to the equivalent predefined access group. In response to the authorized access, container access tool 206 can provide the user access to container 216 (518). For example, container access tool 206 may provide the user access to container 216 via a Secure Shell (SSH) session. The user can then access container 216 (520). For example, the access of container 216 may be via container access tool 206. When the user is finished accessing container 216, the user may exit from container 216 (522). For example, the user may log out of the SSH session. Upon detecting the exit from container 216 (e.g., upon detecting the user's log out of the SSH session), container access tool 206 may send a message to container 216 requesting closure of the user session used to access container 216 (524) (e.g., send a request to close the current user session associated with the temporary user credentials). In response, user management tool 218 may delete the temporary user credentials (e.g., the temporary username and password) used to access container 216 (526). User management tool 218 may also delete the user from container 216 and delete the custom rules created for the access to container 216. On the credential expiration date set for the temporary user credentials, user management tool 218 may check to determine whether the temporary user credentials have been deleted. If the temporary user credentials have not been deleted, user management tool 218 may delete the temporary user credentials on the credential expiration date.

FIG. 6 is a block diagram illustrating selective components of an example computing device 600 in which various aspects of the disclosure may be implemented, in accordance with an embodiment of the present disclosure. For example, illustrative computing device 600 can perform all or part of the processes described herein. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes described herein (e.g., processes illustrated and described with reference to FIGS. 1 through 5). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative client device or server and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 602 may be analog, digital, or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   receiving, by a container hosted on a computing device, a request to access the container, wherein the request includes a temporary username and password and an access group, wherein the access group is a user group to which a user associated with the request belongs;
   creating, by the container, a temporary user credentials based on the temporary username and password passed with the request to access the container;
   adding, by the container, the user to the container;
   mapping, by the container, the access group passed with the request to an equivalent predefined access group within the container;
   assigning, by the container, the user to the equivalent predefined access group, wherein the predefined access group within the container specifies permissions to be granted to the user;
   providing, by the container, access to the container based on the temporary user credentials and the equivalent predefined access group; and
   sending, by the container, a response to the request to access the container, wherein the response includes information about the provided access to the container.

2. The method of claim 1, wherein the access to the container is via a Secure Shell (SSH) session.

3. The method of claim 1, further comprising, creating, by the container, one or more custom rules to be applied to the access of the container.

4. The method of claim 3, wherein a custom rule of the one or more custom rules defines an additional security check to authenticate the user.

5. The method of claim 3, wherein a custom rule of the one or more custom rules defines a prerequisite command performed prior to user login to the container.

6. The method of claim 1, further comprising:
receiving, by the container, a request to close a user session associated with the temporary user credentials; and
deleting, by the container, the temporary user credentials in response to the request to close the user session associated with the temporary user credentials.

7. The method of claim 1, further comprising, setting, by the container, an expiration for the temporary user credentials to a credential expiration day.

8. The method of claim 7, wherein the credential expiration day is passed with the request to access the container.

9. The method of claim 1, further comprising, deleting, by the container, the temporary user credentials on a credential expiration date.

10. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
receiving, by a container, a request to access the container, wherein the request includes a temporary username and password and an access group, wherein the access group is a user group to which a user associated with the request belongs;
creating, by the container, a temporary user credentials based on the temporary username and password passed with the request to access the container;
adding, by the container, the user to the container;
mapping, by the container, the access group passed with the request to an equivalent predefined access group within the container;
assigning, by the container, the user to the equivalent predefined access group, wherein the predefined access group within the container specifies permissions to be granted to the user;
providing, by the container, access to the container based on the temporary user credentials and the equivalent predefined access group; and
sending, by the container, a response to the request to access the container, wherein the response includes information about the provided access to the container.

11. The system of claim 10, wherein the access to the container is via a Secure Shell (SSH) session.

12. The system of claim 10, wherein the process further comprises, creating, by the container, one or more custom rules to be applied to the access of the container.

13. The system of claim 10, wherein the process further comprises:
receiving, by the container, a request to close a user session associated with the temporary user credentials; and
deleting, by the container, the temporary user credentials in response to the request to close the user session associated with the temporary user credentials.

14. The system of claim 10, wherein the process further comprises, setting, by the container, an expiration for the temporary user credentials to a credential expiration day.

15. The system of claim 14, wherein the credential expiration day is passed with the request to access the container.

16. The system of claim 10, wherein the process further comprises, deleting, by the container, the temporary user credentials on a credential expiration date.

17. A non-transitory machine-readable medium encoding instructions that when executed by one or more processors cause a process to be carried out, the process including:
receiving, by a container hosted on a computing device, a request to access the container, wherein the request includes a temporary username and password and an access group, wherein the access group is a user group to which a user associated with the request belongs;
creating, by the container, a temporary user credentials based on the temporary username and password passed with the request to access the container;
adding, by the container, the user to the container;
mapping, by the container, the access group passed with the request to an equivalent predefined access group within the container;
assigning, by the container, the user to the equivalent predefined access group, wherein the predefined access group within the container specifies permissions to be granted to the user;
providing, by the container, access to the container based on the temporary user credentials and the equivalent predefined access group; and
sending, by the container, a response to the request to access the container, wherein the response includes information about the provided access to the container.

18. The machine-readable medium of claim 17, wherein the process further comprises, creating, by the container, one or more custom rules to be applied to the access of the container.

19. The machine-readable medium of claim 17, wherein the process further comprises:
receiving, by the container, a request to close a user session associated with the temporary user credentials; and
deleting, by the container, the temporary user credentials in response to the request to close the user session associated with the temporary user credentials.

20. The machine-readable medium of claim 17, wherein the process further comprises, deleting, by the container, the temporary user credentials on a credential expiration date.

* * * * *